(12) United States Patent
Vernoux et al.

(10) Patent No.: US 8,465,631 B2
(45) Date of Patent: Jun. 18, 2013

(54) PURIFICATION STRUCTURE INCORPORATING A BIASED ELECTROCHEMICAL CATALYST SYSTEM

(75) Inventors: Philippe Vernoux, Rochetaillee sur Saone (FR); Abdelkader Hadjar, Lyons (FR); Ahmed Marouf, Cavaillon (FR)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 419 days.

(21) Appl. No.: 12/682,041

(22) PCT Filed: Oct. 2, 2008

(86) PCT No.: PCT/FR2008/051790
§ 371 (c)(1),
(2), (4) Date: Jul. 21, 2010

(87) PCT Pub. No.: WO2009/053589
PCT Pub. Date: Apr. 30, 2009

(65) Prior Publication Data
US 2010/0287916 A1    Nov. 18, 2010

(30) Foreign Application Priority Data
Oct. 8, 2007 (FR) ...................................... 07 58153

(51) Int. Cl.
C25B 9/08 (2006.01)
B01D 53/74 (2006.01)
B01D 53/86 (2006.01)
B01D 53/56 (2006.01)
F01N 3/28 (2006.01)
F01N 3/01 (2006.01)

(52) U.S. Cl.
USPC ........... 204/265; 204/260; 204/266; 205/765; 205/617; 422/168; 422/170; 422/171; 422/180; 423/212; 423/213.7

(58) Field of Classification Search
None
See application file for complete search history.

(56) References Cited

U.S. PATENT DOCUMENTS

| 4,659,448 A * | 4/1987 | Gordon .......................... 204/277 |
| 6,025,084 A * | 2/2000 | Kawasaki et al. ............. 429/456 |
| 6,753,294 B1 * | 6/2004 | Brisley et al. ................. 502/439 |
| 6,878,354 B1 | 4/2005 | Mitsuda et al. |
| 7,250,385 B1 * | 7/2007 | Ohno et al. .................... 502/178 |
| 2005/0074674 A1 * | 4/2005 | Boone et al. .................. 429/247 |

(Continued)

FOREIGN PATENT DOCUMENTS

| EP | 1 382 570 A1 | 1/2004 |
| FR | 2 899 493 A1 | 10/2007 |

(Continued)

Primary Examiner — Harry D Wilkins, III
(74) Attorney, Agent, or Firm — Oblon, Spivak, McClelland, Maier & Neustadt, L.L.P.

(57) ABSTRACT

A device for the purification of a polluted gas, for example an exhaust gas from a diesel or gasoline engine, comprising, in combination: A honeycomb structure, comprising at least one porous electron-conductive material forming the walls (1) of said structure and an electrochemical system for treating said gas, comprising a layer (7) of an ionically conductive and electronically insulating material D, a reduction catalyst A (9) for reducing the polluting species of the $NO_x$ type and an oxidation catalyst B (4) for oxidizing the polluting species of the soot, hydrocarbon HC, CO or $H_2$ type, said electrochemical system being configured in the form of an electrode W and a counterelectrode CE; and means for applying a voltage or a current between said electrode W and said counterelectrode CE.

19 Claims, 6 Drawing Sheets

U.S. PATENT DOCUMENTS

| | | | |
|---|---|---|---|
| 2005/0167286 A1* | 8/2005 | Awano et al. | 205/765 |
| 2007/0039295 A1* | 2/2007 | Ohno | 55/482 |
| 2009/0163354 A1* | 6/2009 | Andy et al. | 502/66 |
| 2009/0173623 A1* | 7/2009 | Kato | 204/270 |

FOREIGN PATENT DOCUMENTS

| | | | |
|---|---|---|---|
| JP | 08-066621 A * | 3/1996 | |
| JP | 08-332342 A * | 12/1996 | |
| JP | 2001-145820 | 5/2001 | |
| JP | 2001-145837 | 5/2001 | |
| JP | 2003-265931 * | 9/2003 | |
| JP | 2004-58029 | 2/2004 | |
| JP | 2004-223400 A * | 8/2004 | |

* cited by examiner

PURIFICATION STRUCTURE INCORPORATING A BIASED ELECTROCHEMICAL CATALYST SYSTEM

The present invention relates to the field of structures for purifying a gas laden with gaseous pollutants essentially of the $NO_x$ type. More particularly, the invention relates to honeycomb structures, especially those used to treat exhaust gases of a gasoline engine or preferably a diesel engine, and incorporating a system that combines a reduction catalyst A for reducing said polluting species of the $NO_x$ type and an oxidation catalyst B for oxidizing hydrocarbons HC and/or for oxidizing soot and/or steam reforming reactions of the $HC+H_2O \rightarrow 3/2H_2+CO$ and/or water gas reactions of the $CO+H_2O \rightarrow H_2+CO_2$ type.

The techniques and the problems associated with purifying polluted gases, especially at the exit of gasoline or diesel automobile exhaust lines, are well known in the art. A conventional three-way catalyst is used for the combined treatment of $NO_x$, CO and HC pollutants and for their conversion into inert and chemically harmless gases such as $N_2$, $CO_2$ and $H_2O$. However, very high efficiency of the system is reached only by continually adjusting the richness of the air/fuel mixture. It is thus known that the slightest deviation from stoichiometry of the mixture causes a substantial increase in pollutant emissions.

To solve this problem, it has been proposed to incorporate with the catalyst materials for temporarily fixing the $NO_x$ (often called in the art $NO_x$ traps) when the mixture is lean (i.e. substoichiometric). However, the major drawback of such a system is that the reduction of the $NO_x$ can take place only at the cost of an overconsumption of fuel during a subsequent phase of operation with a rich mixture. The desorption of the trapped $NO_x$ on the catalyst and their catalytic reduction to gaseous nitrogen $N_2$ can be obtained only in the presence, within the reduction catalyst, of a sufficient quantity of reducing species, in the form of hydrocarbons or carbon monoxide CO or else hydrogen $H_2$, the hydrogen itself possibly being obtained by a catalytic reaction between the hydrocarbons HC and steam or between CO and steam.

At present, no system is known that allows substantial conversion of $NO_x$ into $N_2$ in a lean atmosphere, that is to say in the presence of an excess amount of oxygen. One of the aims of the present invention is specifically to provide such a system, in particular enabling a substantial quantity of $NO_x$ to be converted even when exhaust gases have a lean air/fuel ratio.

According to a different approach, U.S. Pat. No. 6,878,354 describes a combination of HC and CO oxidation and NO reduction catalysts operating electrochemically. Such systems appear to be advantageous as they enable an electrochemical reaction to take place between a reduction catalyst A and an oxidation catalyst B that are connected together both by an electron conductor C and an ion conductor D. According to that publication, such a system makes it possible in particular to increase the catalytic conversion of the polluting species, especially when an engine is operating with a lean mixture.

According to the authors, the presence of such a system comprising an ion conductor and an electron conductor allows simultaneous oxidation of the reducing species of the HC, CO, soot and $H_2$ type and reduction of the oxidizing species of the $NO_x$ type, according to the general principle illustrated by FIG. 1 of that patent.

However, the efficiency of such a system appears limited as its correct operation requires a close contact between the four elements constituting the electrochemical system. Thus, in the embodiments described in the U.S. Pat. No. 6,878,354, the catalysts A and B are deposited in the form of particles on the monolith. The efficiency of such a system then depends strongly on the conditions under which the catalysts A and B and the electron conductor C and ion conductor D are deposited. This is because the properties obtained are strongly dependent on the dispersion of the various phases corresponding to the various constituents on the support used, a connection being necessary between these four elements in order for the electrochemical system to operate properly.

Furthermore, the efficiency of converting the polluting species may also be substantially limited by the intrinsic characteristics of the materials used as ion and electron conductors. More precisely, since the electrochemical system consists of small particles randomly disposed with respect to one another, its efficiency is necessarily limited, on the one hand, by the connections between the particles, and, on the other hand, by the small quantity of conductors (electrons and/or ions) that are available for the electrochemical catalyst system to operate properly.

The aim of the present invention is to provide a solution for solving the problems mentioned above. In particular, one of the objects of the present invention is to provide a structure for the purification of a polluted gas, in particular a structure for filtering a gasoline, or preferably diesel, engine exhaust gas laden with gaseous pollutants and with solid particles, which can operate efficiently irrespective of the richness of the air/fuel mixture.

The present invention relates in its most general form to a device for the purification of a polluted gas, for example a diesel or gasoline engine exhaust gas, comprising in combination: A honeycomb structure, comprising at least one porous electron-conductive material forming the walls of said structure and an electrochemical system for treating said gas, comprising a layer of an electronically insulating and ionically conductive material D, a reduction catalyst A for reducing the polluting species of the $NO_x$ type and an oxidation catalyst B for oxidizing the polluting species of the soot, hydrocarbon HC, CO or $H_2$ type, said electrochemical system being configured in the form of an electrode W and a counterelectrode CE; and means for applying a voltage or a current between said electrode W and said counterelectrode CE.

More precisely, the invention relates to a device for the purification of a polluted gas, for example an exhaust gas from a diesel or gasoline engine, comprising, in combination:
  a honeycomb structure comprising at least one porous electron-conductive material forming the walls of said structure and an electrochemical system for treating said gas, comprising:
    a layer of an electronically insulating and ionically conductive material D,
    a reduction catalyst A for reducing the polluting species of the $NO_x$ type, in contact with the ion conductor D, forming all or part of an electrode W or electrically connected to an electrode W and
    an oxidation catalyst B for oxidizing the polluting species of the soot, hydrocarbon HC, CO or $H_2$ type, in contact with the ion conductor D, forming all or part of a counterelectrode CE or electrically connected to a counterelectrode CE, the catalyst B being placed in contact with the electron-conductive material forming the walls of the honeycomb and said layer of ion conductor D being placed between the catalyst A and the catalyst B so as to electronically isolate them; and
  means for applying a voltage or a current between said electrode W and said counterelectrode CE.

Preferably, the electron-conductive material forming the walls of the honeycomb is a porous inorganic electron-conductive material and in which the gas to be purified flows through said porous walls.

According to one possible embodiment of the invention, plugs obstruct at one of their ends the channels formed between the walls of the channels of the honeycomb structure so as to define alternately inlet channels and outlet channels for the gas to be purified, said plugs being formed in an electron-conductive material and being in electronic contact with the catalysts A or B, the electrode w of the electrochemical system comprising the set of plugs placed at the inlet of the structure and the counterelectrode CE of the electrochemical system comprising the set of plugs placed at the outlet of the structure.

For example, the oxidation catalyst B is deposited in the pores of the porous inorganic material.

Typically, the current density applied between the electrode and the counterelectrode is greater than 0.01 mA/cm$^2$.

The ion conductor is ionically conductive by $O^{2-}$ ions or by $H^+$ ions.

For example, the material D is oxygen-ion conductive of the fluorite structure type, for example zirconia stabilized by CaO or by $Y_2O_3$, or cerium gadolinium mixed oxides, or of the perovskite structure of the gallate type, compounds based on lanthanum, for example $LaAlO_3$ or $LaGaO_3$ or $La_{1-x}Sr_xGa_{1-y}Mg_yO_3$ or of the BIMEVOX structure, for example $Bi_2V_{1-x}Me_xO_z$ or of the LAMOX structure, for example $La_2Mo_2O_9$ or of the apatite structure, for example $Me_{10}(XO_4)_6Y_2$.

The material D may also be a proton conductor of the perovskite type, for example $SrCe_{1-x}M_xO_{3-\alpha}$ where M is a rare earth, for example the compound $SrCe_xYb_{1-x}O_{3-\alpha}$ or of the $BaCe_{1-x}M_xO_{3-\alpha}$ type, for example the compound $BaCeO_3$, or else a compound of the $La_xSr_{1-x}ScO_{3-\alpha}$ family, for example $La_{0.9}Sr_{0.1}ScO_{3-\alpha}$.

The porous inorganic material may comprise or be formed by an inorganic electron-conductive material of the carbide type, for example SiC, or of the silicide type, for example $MoSi_2$, or a boride, for example $TiB_2$, or of the $La_{1-x}Sr_xMnO_3$ family or of the mixed cerium gadolinium oxide (CGO) type.

Within the context of the present description, the porous inorganic material has an open porosity, conventionally measured by mercury porosimetry, of greater than 10%, preferably greater than 20% or even greater than 30%. Too low a porosity of the material constituting the filtering walls results in too high a pressure drop. Too high a porosity of the material constituting the filtering walls results in an insufficient filtration efficiency.

According to one possible embodiment, the porous inorganic material is based on silicon carbide SiC, preferably recrystallized at a temperature between 2100 and 2400° C. In particular, the inorganic material may be based on doped SiC, for example doped by aluminum or nitrogen, preferably in such a way that its electronic resistivity is less than 20 ohms·cm at 400° C., more preferably less than 15 ohms·cm at 400° C. and even more preferably less than 10 ohms·cm at 400° C. The expression "based on SiC" is understood within the context of the present description to mean that the material consists of at least 25% by weight, preferably at least 45% by weight and very preferably at least 70% by weight of SiC.

Usually, the reduction catalyst A comprises at least one precious metal chosen from Pt, Pd or Rh or Ag or transition metals, especially Cu, Fe, Ni, Co, and at least one metal or a metal oxide of the group comprising alkali metals, alkaline earths, rare earths or transition metals. The catalyst A used for the reduction reaction is for example chosen from the catalysts well known in the art for their activity and preferably for their selectivity with respect to $NO_x$ reduction reactions. They may especially be chosen from compounds comprising alkali metals or alkaline earths or rare earths, which in particular act as $NO_x$ traps, for example such as those described in application EP 1 566 214, which are deposited as a mixture with an active principle that includes precious metals Pt, Pd, Rh or Ag or transition metals, especially Cu, Fe, Ni or Co, according to any known technique.

Usually, the oxidation catalyst B comprises at least one precious metal chosen from Pt, Pd or Rh or transition metals, especially Cu, Fe, Ni, Co. The catalyst B used for the hydrocarbon oxidation reaction is chosen from catalysts well known in the art for their activity and preferably their selectivity with respect to hydrocarbon oxidation reactions. In particular, the reforming and steam reforming catalysts used in the petrochemical and refining field may be used according to the invention. Those deposited as a mixture with an active principle that includes precious metals Pt, Pd, Rh or transition metals, especially Cu, Fe, Ni or Co, may be used.

The present invention is most particularly applicable in the structures used for the purification and filtration of a diesel engine exhaust gas. Such structures, generally referred to as particulate filters, comprise at least one and preferably a plurality of honeycomb monoliths. Unlike the purification devices described above, in such filters, said monolith or monoliths comprising a set of adjacent ducts or channels of mutually parallel axes which are separated by porous walls and are closed off by plugs at one or other of their ends in order to delimit inlet ducts opening onto a gas intake face and outlet ducts opening onto a gas discharge face, in such a way that the gas flows through the porous walls. Examples of such assembled or non-assembled structures are for instance described in the publications EP 0 816 065, EP 1 142 619, EP 1 306 358 or EP 1 591 430.

In such filtering structures, the gases are forced to flow through the walls. The work carried out by the applicant has shown that the use of an electrochemical catalyst system as described above makes it possible, surprisingly, on the one hand, to achieve a very high conversion of the polluting species without a corresponding substantial increase in the pressure drop caused by introducing the filter into the exhaust line.

Finally, the invention relates to the use of a device according to one of the above embodiments for carrying out an on-board check of the catalytic activity of the catalyst, especially for estimating the efficiency of the catalyst, or for choosing the threshold at which a phase of regenerating said device is initiated or stopped.

The device according to the invention, as described above, also helps to improve the efficiency in regenerating the filter by promoting a higher rate of soot oxidation.

In a preferred embodiment of the invention, which is not, however, limiting, the filtering body according to the invention thus essentially consists of a matrix made of optionally doped porous silicon carbide that constitutes the walls of a honeycomb filtering structure. In a first step, the oxidation catalyst B is deposited, for example by impregnation, in the pores of the filtering body walls. According to the invention, the catalyst B is deposited in proportions and under conditions that preferably allow mutual percolation of the constituent particles, in the form of an electron-conductive network or film. Without departing from the scope of the invention, the particles may be deposited on a catalyst support consisting of an electron-conductive material.

In a second step, the ion-conductive material D is then deposited on the surface of the impregnated SiC walls that are covered by the catalyst B at a layer whose thickness is preferably adjusted so as to remain permeable to the exhaust gases flowing through the wall of the filter and to result in a percolating ion-conductive network.

In a third step, the second reduction catalyst A is then deposited on the layer of the ion-conductive material, for example using conventional impregnation techniques, in such a way that the layer of material D electrically isolates the two catalysts. According to the invention, just like the catalyst B, the catalyst A is deposited in proportions and under conditions allowing the percolation of the constituent particles, in the form of an electron-conductive network or film.

One complete way of implementing the process for obtaining a filter according to the invention is illustrated in the rest of the description, in conjunction with the appended figures, in which.

Figure 1:
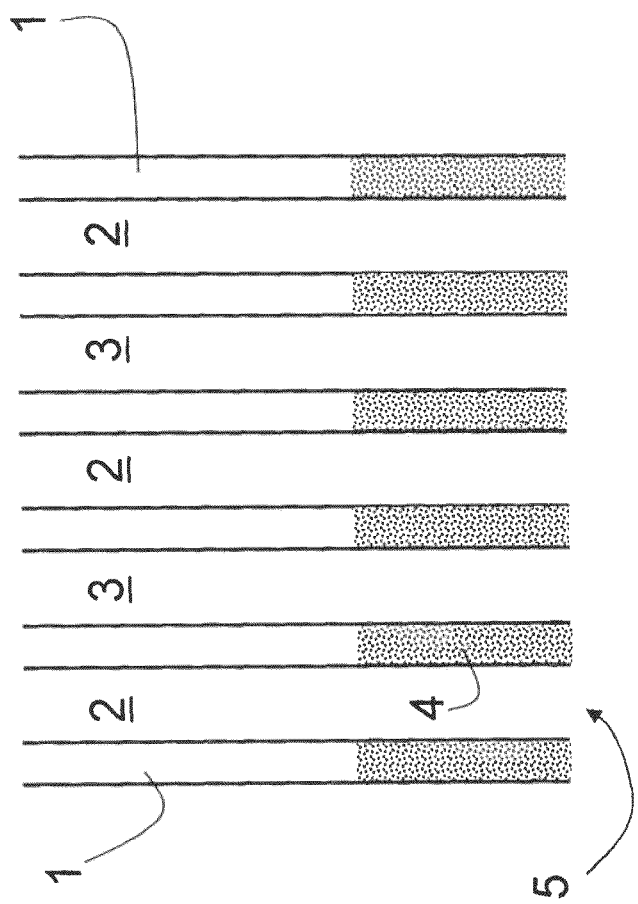
FIG. 1 is a schematic sectional representation of a wall portion of a catalytic filter as described above (step 1), incorporating in its pores a first oxidation or reduction catalyst.

The embodiment shown schematically in FIG. 1 is a longitudinal sectional view, from the gas inlet front face 5, of the parallel walls 1 of a conventional honeycomb particulate filter, for example as described in the applications EP 816 065 or EP 1 142 619.

The constituent material of the walls 1 of the filter is an electron-conductive material, for example SiC doped with aluminum Al, the mercury porosity of which is typically close to 45%. The filter comprises alternately inlet channels 3 and outlet channels 2, depending on the position of the plugs.

The catalyst B, in the form of Rh metal nanoparticles, is deposited by a sol-gel process and using well-known methods into the as yet unplugged honeycomb structure shown in FIG. 1. These nanoparticles are thus dispersed on the electron-conductive SiC within the walls 1 of the channels 2, 3. The impregnation may be carried out only in the lower part of the filter, for example over the first third 4 of the length of the channels starting from the gas inlet front face 5. Of course, without departing from the scope of the invention, the impregnation may relate to a larger or smaller portion of the walls 1, especially so as to limit the pressure drops due to the presence of the catalytic system according to the invention and to fully maintain the filtration role of the structure.

As shown in FIG. 1, the impregnation with the catalytic solution is carried out under conditions that allow the catalytic solution to diffuse through the entire thickness of the walls 1. However, it would not be outside the scope of the invention if only the outermost portion of the walls were to be impregnated. In general, the impregnated thickness of the walls 1 is however at least around 500 nm. After this first impregnation with the catalyst B, the inlet channels 2 of the front face 5 of the honeycomb structure of the unplugged filter are masked with a wax or resin 6, which can be removed simply by heating it to a temperature typically of 300° C. or below, so as not to damage the catalyst layer already present, using masking techniques well known to those skilled in the art. The structure is then dried.

Figure 2:
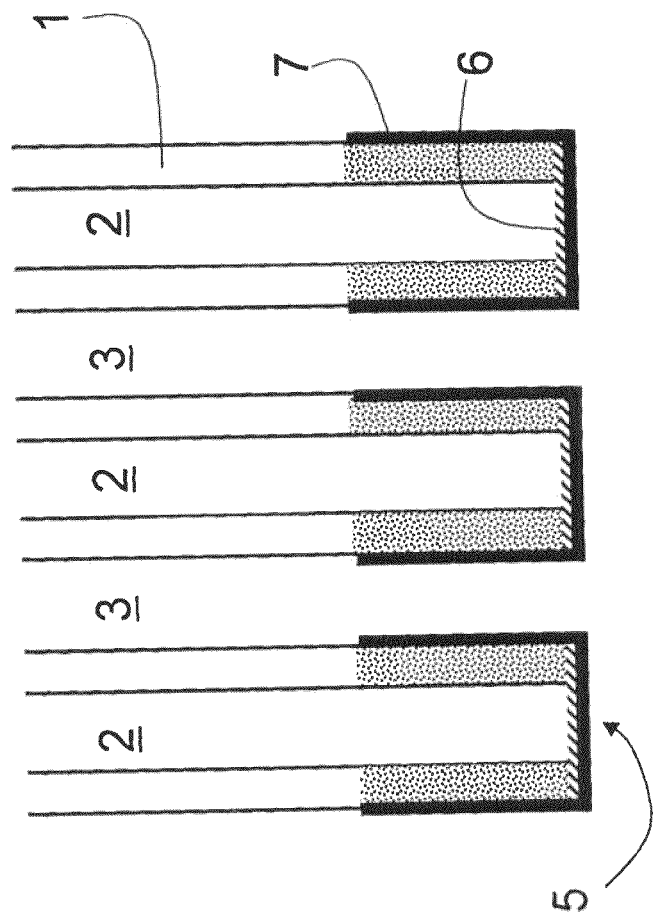
FIG. 2 is a schematic sectional representation of a wall portion of a catalytic filter obtained according to the invention (step 2), incorporating in its pores a first oxidation catalyst B covered with a layer of an ion-conductive material D.

As illustrated in FIG. 2, an ion conductor D is then deposited using a sol-gel process. According to one exemplary embodiment, the initial sol-gel solution employed for the deposition is obtained by mixing yttrium nitrate $YNO_3.6H_2O$ with zirconium nitrate $ZrO(NO_3)_2.6H_2O$ in respective proportions corresponding to a quantity of 8 mol % of $Y_2O_3$ in the layer of yttrium-stabilized zirconia 7 that is finally obtained. According to the invention, the deposited layer may extend beyond the portion 4 of the walls impregnated with the catalyst B. The porosity of this ion-conductive layer 7 is chosen to be low enough to ensure good ionic conduction. Furthermore, the thickness of the ion-conductive layer 7 is also low enough and sufficiently porous to allow the exhaust gases to pass through it when in operation.

The resin masks 6 are then removed and the ion-conductive layer is matured by a 300° C. heat treatment in air. The treatment enables the inlet channels 2 to be cleared. It may be necessary for the surface of these channels to be finely ground for the purpose of removing the resin residues.

After the mask has been removed, the filter is again impregnated with the sol-gel solution of the ion conductor D so as to cover only the lower end 8 of the channels, for example over a height of the order of 1 mm.

Figure 3:
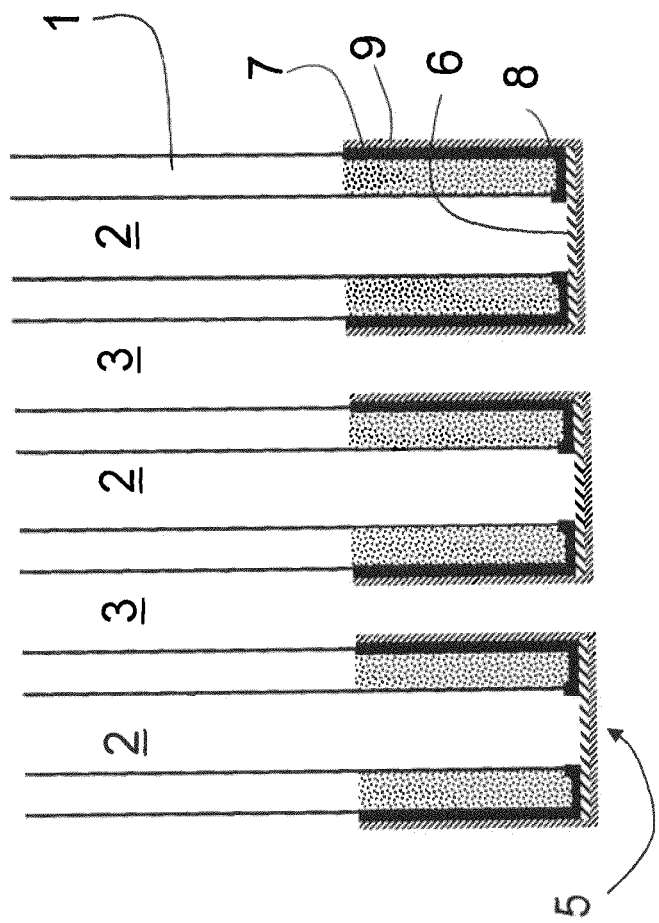
FIG. 3 is a schematic sectional representation of a wall portion of a catalytic filter obtained according to the invention (step 3), incorporating in its pores the oxidation catalyst A covered with a layer of an ion-conductive material electrically isolating the catalyst A from a reduction catalyst B.

As shown in FIG. 3, the inlet channels 2 are then again masked at the front face 5 of the filter, with the same resin 6 as described above.

A solution of catalyst A is prepared from barium and Pt salts. Using well-known techniques, the solution is matured in the form of a sol-gel of catalyst A and then the filter is impregnated with this solution, by simple immersion as previously, in the form of a film or layer 9 placed on the surface or in the pores of the ion-conductive layer 7.

The resin masks 6 are then removed by a 300° C. heat treatment in air. The treatment enables the inlet channels 2 to be cleared. It may be necessary for the surface of these channels to be finely ground for the purpose of removing the resin residues.

Figure 4:
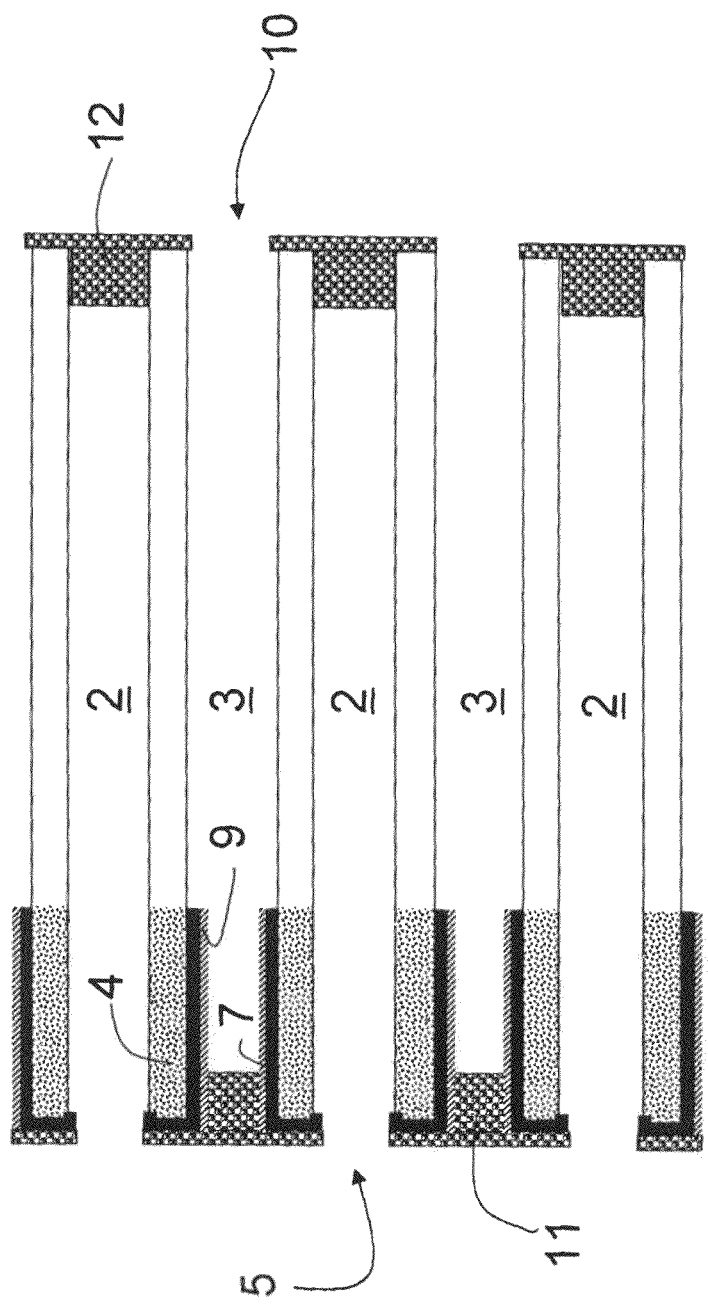
FIG. 4 is a schematic sectional representation of a wall portion of a catalytic filter obtained according to the invention, in which the inlet channels are obstructed by plugs.

Using conventional techniques, the inlet channels are then masked with a suitable paper or resin by using techniques well known in the art. At the front face 5 of the filter, the filter outlet channels 3 not masked by the resin or paper are then closed off by electron-conductive plugs 11, as illustrated in FIG. 4. The plugs 11 are conventionally obtained by applying an SiC-based slurry to the end of the outlet channels 3, followed by a solidification heat treatment at 500° C.

Using the same method, already used for the inlet plugs, inlet channels on the rear face 10 of the filter are then closed off by electron-conductive plugs 12.

The process thus used therefore results in a filter illustrated schematically by FIG. 4.

Figure 5:
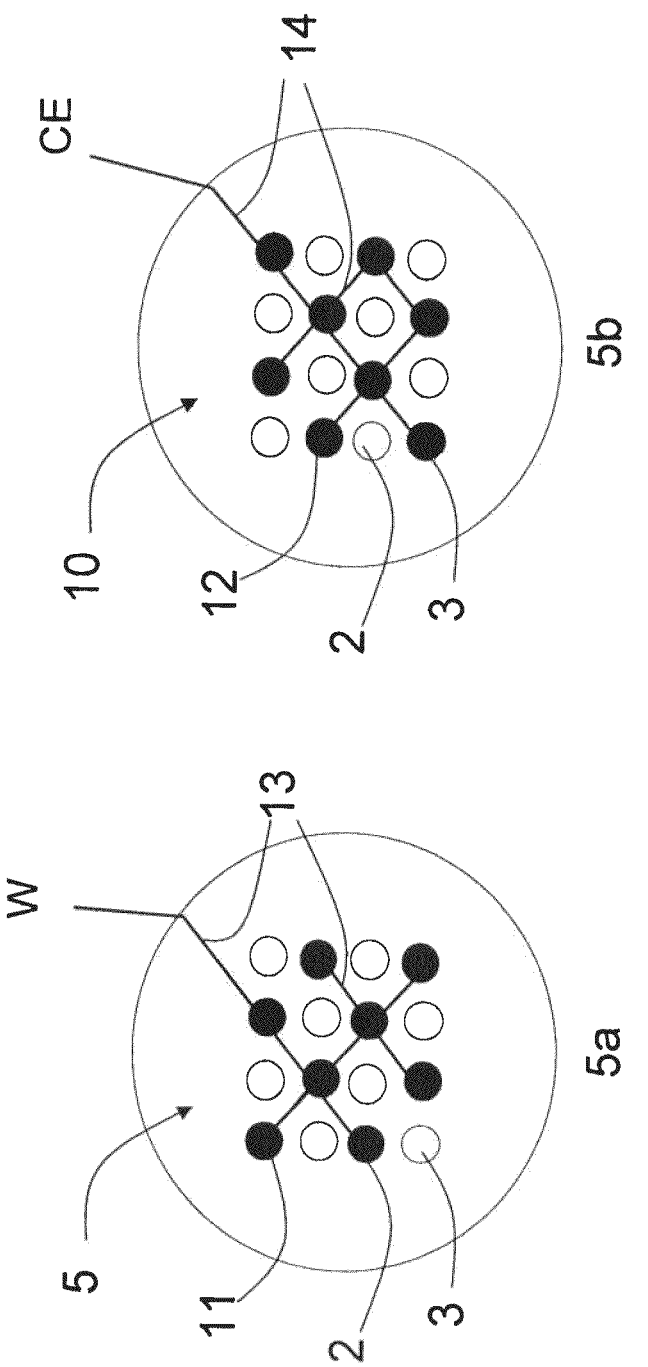
FIG. 5 shows an end view of the inlet 5a and outlet 5b faces of the filtration system according to the invention.

FIG. 5 shows an end view of the inlet face 5a and outlet face 5b of a filtration system according to the invention produced from the filter shown in FIG. 4.

As illustrated in FIG. 5 and described previously, the plugs 11 obstructing the outlet channels 3 on the inlet face (FIG. 5a) and plugs 12 obstructing the inlet channels 2 on the outlet face (FIG. 5b) are made of conductive SiC.

On the inlet face, all the plugs 11, placed in contact with the particles of catalyst A, are connected together by metal wires 13 within a working electrode W. The working electrode W thus obtained is shown schematically in FIGS. 4 and 5a.

The catalyst B is placed on the surface and/or in the walls 1 in the form of a layer present over a length of wall 4. The particles of catalyst B are thus in contact with the SiC electron-conductive walls of the monolith but are electronically isolated from the particles of catalyst A by the ion-conductive layer 7.

All the electron-conductive plugs 12 on the outlet face of the filter (FIG. 5b) are connected together by metal wires 14 within a counterelectrode CE. The counterelectrode CE is thus obtained by electronically contacting all the layers or films of catalyst B by means of the walls and of the SiC electron-conductive plugs.

Typically, application of a negative potential difference between W and CE will have the effect of causing the oxide ions contained in the ion-conductive layer of the catalyst A to migrate toward the catalyst B and thus simultaneously promote, within the filtration structure, the reduction of the oxidizing species and the oxidation of the reducing species present in the exhaust gases.

In operation, the combustion gases coming from the engine enter the filtering structure via the inlet channels 2 and are directly in contact with the layer 4 of oxidation catalyst B, enabling the pollutants of the type such as soot, HC, CO etc. to be removed. The gases then flow through the porous walls 1 and then arrive directly in contact with the layer 9 of the reduction catalyst A for reducing the $NO_x$ polluting species. The gases, substantially stripped of their pollutants, are then discharged via the outlet channels 3.

However, the invention is not limited to the embodiment as described above but should be understood as relating to any catalyzed filtering structure which comprises at least one oxidation catalyst and one reduction catalyst and is biased according to the above principle. The filtration structures according to the invention comprise adjacent inlet channels and outlet channels bounded by porous walls, the ends of which are alternately plugged on one side and then on the other, according to the conventional technology of particulate filters for internal combustion engines.

According to one essential feature of the invention, the catalyzed filter is biased by applying an electrical current or a voltage typically from an electrical generator, in such a way that the current density applied between the electrode and the counterelectrode is greater than 0.01 $mA/cm^2$, preferably greater than 0.05 $mA/cm^2$ and typically between 0.01 and 10 $mA/cm^2$. The surface area taken into account is the sum of the specific surface areas of the coating A and of the coating B.

The invention also relates to an exhaust line incorporating the combustion gas purification device for an engine, preferably a diesel engine, equipped as described above. The device may especially include a system for applying a voltage of 0 to 10 volts in absolute value controlled by a control system, in particular as a function of the engine speed and/or possibly other data characteristic of the operation of the engine and/or of the exhaust line.

The device according to the invention may also include additional means for carrying out an on-board check of the catalytic activity of the catalyst. According to one possible embodiment, the check may consist simply in stopping the bias and in measuring the potential difference that remains between the working electrode W and the counterelectrode CE. From reference values, typically established on the basis of model cells, corresponding to the measured no-voltage potential difference, the efficiency of the catalyst can be simply and rapidly estimated and, where appropriate, a necessary electrical bias correction may be applied.

According to another possible embodiment, the measurement of the no-voltage potential difference may induce or participate among other parameters (pressure drop, weight of the filter, etc.) in the choice of the threshold at which a regeneration phase is initiated or stopped.

The electrochemical system according to the present invention is suitable not only for reducing the $NO_x$ gases coupled with oxidation of the soot (solid particles) present in the walls of the particulate filter, but also for reducing the $NO_x$ gases coupled with oxidation of the gaseous reducing species contained in the exhaust gas, such as unburnt hydrocarbons and/or carbon monoxide.

The electrochemical system according to the present invention has many advantages:
the electrons necessary for the $NO_x$ reduction reaction and the anions necessary for the HC and/or CO and/or soot oxidation reaction are advantageously supplied directly by the support, thereby allowing the electrochemical system to operate with an approximately constant amount of conductive species, which is not limited by the size of the solid electrolyte(s);
the operation of the electrochemical catalyst system is improved since all of the catalyst A and B particles are active: The electrochemical system is active irrespective of the relative disposition of the A and B particles in the pores of the material constituting the walls.

In the embodiment illustrated in FIGS. 1 to 5, the ionic conduction is provided by a material that is ionically conductive by $O^{2-}$ ions. Of course, without departing from the scope of the invention, any other material providing this type of conduction or conduction by migration of other ions (cations or anions) may be used, especially materials known for their proton conductivity, as described in the U.S. Pat. No. 6,878,354.

In a manner as yet undescribed in the literature in this field, the trials carried out by the applicant have also shown that applying a negative bias according to the invention, i.e. applying a negative potential difference between the cathode and the anode (resulting in the supply of electrons to the cathode), not only allows the electrochemical system according to the invention to operate efficiently but also has the effect of appreciably increasing the $NO_x$ storage capacity of the reduction catalyst A, even with a lean mixture, i.e. in the presence of substantial amounts of oxygen. Such a property within the catalyzed filter according to the invention allows continuous electrochemical $NO_x$ reduction, not only during the phases in which the engine operates with a rich mixture, that is to say during the $NO_x$ desorption phase, but also, surprisingly, with a lean mixture, some of the $NO_x$ stored being immediately reduced by the catalyst A.

This particular advantage is illustrated by the following embodiment example:

EXAMPLE

Figure 6:
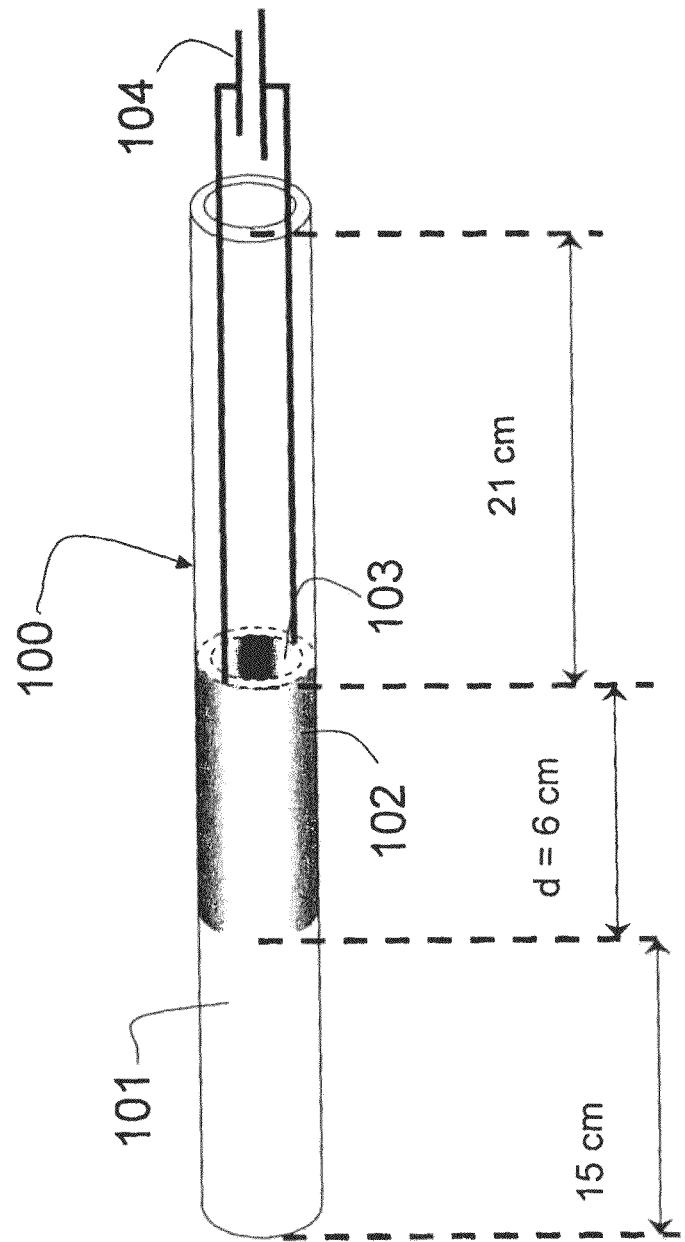
FIG. 6 illustrates the experimental device used to demonstrate the efficiency of the filter according to the invention (see the examples that follow).

An electrochemical catalyst system 100 was produced based on a tube made of yttrium-stabilized zirconia $(ZrO_2)_{0.92}(Y_2O_3)_{0.08}$, with a length of 42 cm and a thickness of 3 mm. The tube constituted the ion conductor D (conduction by $O^{2-}$ ions). As shown in FIG. 6, two platinum films 102, 103 were deposited using a platinum lacquer respectively on the two, external and internal, faces of the tube, over a distance d of 6 cm.

Ba particles were then deposited on the surface of the platinum film 102 already deposited on the external face of the tube by using a solution of barium acetate $(CH_3CH_2O)_2Ba$.

The tube was calcined at 500° C. for one hour in air after each deposition step.

The two Pt films 102, 103 thus formed the working electrode and the counterelectrode, respectively, for the internal face.

The working electrode 102 was exposed on the external face to the reaction mixture consisting of gas comprising nitrogen monoxide and oxygen, as described in Table 1, whereas the electrode 103 was maintained in air.

Several cycles were thus carried out in order to obtain a representative average value of the property of said system to store and to convert the $NO_x$ in an oxygen-rich mixture.

Between each series of measurements, the surface of the Pt/Ba catalyst was regenerated by sweeping in a stream of a reducing gas ($H_2$) so as to desorb all the nitrogen oxides.

Firstly, the measurements were carried out in the absence of a bias, and then secondly the working electrode and the counterelectrode were connected to a generator 104, subjecting them to a bias voltage of −4 volts.

The experimental measurement data are given in Table 1. The experimental results of the trials (biased device and unbiased device) are given in Table 2.

TABLE 1

Experimental data
Trial conditions

| | |
|---|---|
| Specimen preparation (tube Pt/BaCO$_3$/YSZ) | Dense tube made of YSZ (an ionic conductor) + Pt/Ba deposition<br>Composition of the gas to be purified: NO/O$_2$<br>Contents:<br>Storage (oxidizing) phase: NO (1200 ppm)<br>O$_2$: 0.7%, 2% and 6% (O$_2$ pressure)<br>Desorption phase: H$_2$<br>Gas flowrate: 4.3 l'h (the same for both phases)<br>Temperature: 500° C.<br>Measurement sensor position: thermocouple (temperature sensor) placed about 3 mm from the surface of the catalyst; the gas analyzed at the outlet of the reactor by IR and µGC analyzers. |
| Electrical bias | Measurement 1: No bias    Measurement 2: 4 V bias voltage [migration of the oxide ions from the working electrode toward the ion conductor] limiting (maximum) current induced in the storage phase: −0.195 mA/cm$^2$ (for 2% and 6% O$_2$) and −0.16 mA/cm$^2$ (for 0.7% O$_2$) nature of the conductors: O$^{2-}$ ion conductor (YSZ) |

TABLE 2

Experimental results

| Measurement results and observed effects | Measurement 1: Unbiased electrochemical catalyst device | | | Measurement 2: Biased electrochemical catalyst device (bias voltage = −4 V) | | |
|---|---|---|---|---|---|---|
| Oxygen content of the gas to be treated (NO = 1200 ppm) | 0.7% O$_2$ | 2% O$_2$ | 6% O$_2$ | 0.7% O$_2$ | 2% O$_2$ | 6% O$_2$ |
| Content of NO$_x$ stored (in µmol over a period of 10 min) | 4 | 6 | 10 | 8 | 11 | 17 |
| % NO$_x$ stored | 13% | 18.5% | 34% | 27% | 33% | 54% |
| Content of NO$_x$ converted to N$_2$ electrochemically (expressed in µmol) | No conversion | | | 1 | 2 | 1.3 |
| Percentage of NO$_x$ converted relative to the amount stored during the storage phase | | | | 11% | 18% | 7% |

The experimental results reported in Table 2 show not only an increase in the nitrogen oxide storage capacity of the catalytic system when the system is biased (measurement 2), despite the presence of a large amount of oxygen in the gas to be treated, something which has never hitherto been observed, but also the electrochemical conversion of the $NO_x$ into $N_2$ during the desorption phase.

The invention claimed is:

1. A device for purification of a polluted gas, comprising:
a honeycomb structure comprising at least one porous electron-conductive material forming walls of said structure and an electrochemical system for treating said gas, comprising:
a layer of an electronically insulating and ionically conductive material D,
a reduction catalyst A for reducing the polluting species of the $NO_x$ type, in contact with the electronically insulating and ionically conductive material D which forms all or part of an electrode W or which is electrically connected to an electrode W and an oxidation catalyst B for oxidizing polluting species selected from the group consisting of soot, hydrocarbons, CO, $H_2$, and mixtures thereof, in contact with the electronically insulating and ionically conductive material D which forms all or part of a counterelectrode CE or which is electrically connected to a counterelectrode CE,
wherein the oxidation catalyst B contacts the electron-conductive material forming the walls of the honeycomb structure, wherein said layer of electronically insulating and ionically conductive material D is between the reduction catalyst A and the oxidation catalyst B so as to electronically isolate each catalyst from the other, and
wherein the honeycomb structure is capable of simultaneously reducing polluting species of the $NO_x$ type and oxidizing polluting species selected from the group consisting of soot, hydrocarbons, CO, $H_2$, and mixtures thereof.

2. The device as claimed in claim 1, in which the porous electron-conductive material forming the walls of the honeycomb structure is a porous inorganic electron-conductive material.

3. The device as claimed in claim 2, in which the oxidation catalyst B is deposited in pores of the porous inorganic material.

4. The device as claimed in claim 2, in which the porous inorganic material comprises or is formed by an inorganic electron-conductive material having a structure selected from the group consisting of a carbide structure, a silicide structure, a boride structure, a $La_{1-x}Sr_xMnO_3$ structure, and a mixed cerium gadolinium oxide structure.

5. The device as claimed in claim 1, further comprising plugs at one end of channels formed between walls of channels of the honeycomb structure so as to define alternately inlet channels and outlet channels for gas to be purified, said plugs being formed in an electron-conductive material and being in electronic contact with the catalysts A or B, the electrode W of the electrochemical system comprising plugs placed at the inlet of the structure and the counterelectrode CE comprising plugs placed at the outlet of the structure.

6. The device as claimed in claim 1, in which the electronically insulating and ionically conductive material D is ionically conductive by $O^{2-}$ ions or by $H^+$ ions.

7. The device as claimed in claim 6, in which the electronically insulating and ionically conductive material D is oxygen-ion conductive having a structure selected from the group consisting of a fluorite structure, a perovskite structure, a BIMEVOX structure, a LAMOX structure, and an apatite structure.

8. The device as claimed in claim 6, in which the electronically insulating and ionically conductive material D is a proton conductor having a structure selected from the group consisting of a perovskite structure, a $BaCe_{1-x}M_xO_{3-\alpha}$ structure and, a compound of $La_xSr_{1-x}ScO_{3-\alpha}$.

9. The device as claimed in claim 1, in which the porous electron-conductive material comprises silicon carbide.

10. The device as claimed in claim 9, in which the porous electron-conductive material comprises doped silicon carbide, wherein an electronic resistivity is less than 20 ohms·cm at 400° C.

11. The device as claimed in claim 1, in which the reduction catalyst A comprises (1) at least one metal selected from the group consisting of Pt, Pd, Rh, Ag and transition metals, and (2) at least one metal or metal oxide of an alkali metal, an alkaline earth, a rare earth or a transition metal.

12. The device as claimed in claim 1, in which the oxidation catalyst B comprises at least one metal selected from the group consisting of Pt, Pd, Rh and transition metals.

13. The device as claimed in claim 1, comprising at least one or more of honeycomb monoliths, said monolith or monoliths comprising a set of adjacent ducts or channels of mutually parallel axes which are separated by porous walls and are closed off by plugs at one end to delimit inlet ducts opening onto a gas intake face and outlet ducts opening onto a gas discharge face.

14. The device as claimed in claim 1, further comprising a continuous negative potential difference source between said electrode W and said counterelectrode CE.

15. The device as claimed in claim 14, wherein gas to be purified flows through said porous walls.

16. The device as claimed in claim 1, wherein gas to be purified flows through said porous walls.

17. The device as claimed in claim 16, in which a current density applied between the electrode and the counterelectrode is greater than 0.01 $mA/cm^2$.

18. A method for carrying out an on-board check of a catalytic activity of a catalyst, comprising flowing gas through the device as claimed in claim 1 to check of the catalytic activity of the catalyst.

19. A method of continuous and simultaneous treatment of pollutants comprising continuously and simultaneously reducing polluting species of the $NO_x$ type and oxidizing polluting species selected from the group consisting of soot, hydrocarbons, CO, $H_2$, and mixtures thereof in the device as claimed in claim 1.

* * * * *